(12) United States Patent
Hsieh

(10) Patent No.: US 7,972,411 B2
(45) Date of Patent: Jul. 5, 2011

(54) METHOD FOR SEPARATING DROSS IN SOLDERING PROCESS

(75) Inventor: Ching-Feng Hsieh, Taipei (TW)

(73) Assignee: Askey Computer Corporation, Taipei (TW)

( * ) Notice: Subject to any disclaimer, the term of this patent is extended or adjusted under 35 U.S.C. 154(b) by 0 days.

(21) Appl. No.: 12/688,369

(22) Filed: Jan. 15, 2010

(65) Prior Publication Data

US 2011/0132145 A1    Jun. 9, 2011

(30) Foreign Application Priority Data

Dec. 8, 2009   (TW) ............................... 98141821 A

(51) Int. Cl.
  *B01D 43/00*   (2006.01)
(52) U.S. Cl. ............................. 75/401; 75/403; 75/690
(58) Field of Classification Search .................... 75/401, 75/403, 690
  See application file for complete search history.

(56) References Cited

U.S. PATENT DOCUMENTS 5,755,889 A * 5/1998 Johnson .......................... 75/414
6,890,430 B2 * 5/2005 Mawatari ....................... 210/173

FOREIGN PATENT DOCUMENTS

CN   201283248 Y *  8/2009

OTHER PUBLICATIONS

Machine translation of CN 201283248 Y published Aug. 2009.*

* cited by examiner

*Primary Examiner* — George Wyszomierski
*Assistant Examiner* — Tima M McGuthry-Banks
(74) *Attorney, Agent, or Firm* — Edwards Angell Palmer & Dodge LLP; Peter F. Corless; Steven M. Jensen

(57) ABSTRACT

Proposed is a method for separating dross in a soldering process for a printed circuit board using a tin bath containing liquid tin. The method includes collecting dross produced during the soldering process; grinding the dross to tin ash in the tin bath for allowing a portion of tin contained in the tin ash to be melted again to join the liquid tin; and scooping up and recycling the tin ash not melted in the tin liquid. The method precludes a waste of tin resources and high manufacturing costs which might otherwise arise from directly scooping up dross of high tin content.

9 Claims, 2 Drawing Sheets

METHOD FOR SEPARATING DROSS IN SOLDERING PROCESS

CROSS-REFERENCES TO RELATED APPLICATIONS

This application claims under 35 U.S.C. §119(a) the benefit of Taiwanese Application No. 098141821 filed Dec. 8, 2009 the entire contents of which is incorporated herein by reference.

BACKGROUND OF THE INVENTION

1. Field of the Invention

The present invention relates generally to dross separation methods, and more particularly, to a dross separation method applied in a soldering process for a printed circuit board.

2. Description of Related Art

In the manufacturing process of a printed circuit board (PCB), a soldering process plays a key role in determining the quality of the printed circuit board manufactured, which is conventionally performed in an automatic wave soldering furnace.

The automatic wave soldering furnace essentially comprises a conveyor belt, a flux adding zone, a preheating zone and a tin bath. The conveyor belt is used for conveying a printed circuit board into the automatic wave soldering furnace, passing through the flux adding zone, the preheating zone and the tin bath. The flux adding zone essentially comprises an infrared sensor and a nozzle, wherein the infrared sensor senses whether a printed circuit board has come into the furnace and measures the length of the printed circuit board. The flux is used for forming a protective film on the soldering surface of the printed circuit board. The preheating zone is used to provide a suitable temperature to enhance the flux activity so as to form good solder joints. Heating pipes and a tin pump are disposed in the tin bath such that molten solder (liquid tin formed after tin is melted) is sprayed upwards to form a projected solder wave. During the soldering process, a printed circuit board with components placed thereon is coated with flux, preheated and passed across the solder wave so as to solder the components to solder pads of the printed circuit board.

In a practical wave soldering process, after tin in a tin bath is melted, high-temperature tin on the surface of the molten tin is in direct contact with air. Particularly, the tin at the nozzle of the tin bath continuously rolls and is in direct contact with the air, thereby producing some dross (oxide of tin) floating on the liquid tin. If the dross is not removed timely, solder falling back from the solder wave will fall on the surface of the dross. Since the falling solder is in a semi-solidified state, it is easy to flow out of the tin bath, which is both wasteful and dangerous. Therefore, it is extremely important to timely remove the dross.

Generally, the dross is scooped up and collected and then disposed in a recovery machine to recover pure tin from the dross. However, the recovery machine is quite expensive and susceptible to serious heavy metal pollution, and thus the recovery machine requires peripheral equipments to prevent serious heavy metal pollution, which is not cost-effective for manufacturers. Therefore, the dross is usually sold to scrap dealers. In the practical soldering process, the dross floating on the liquid tin needs to be periodically removed so as to prevent overflow of the liquid tin, thereby increasing the burden on operators. Since the dross has to be frequently scooped away, it is necessary to add new solder material to the tin bath to replenish the tin bath, which accordingly increases the solder consumption. A method for reducing the generation of dross involves adding a reducing powder in the tin bath. But the reducing powder bring serious pollution to the tin bath and is not easy to clean, and the number of times for the replacement of tin increases with the replacement of the reducing powder. Therefore, the method is seldom used.

To overcome the above drawbacks, an antioxidant oil is introduced over the liquid solder to isolate the liquid solder from the air so as to minimize oxidation of the solder, as the antioxidant oil floats on the liquid tin. However, the oil sludge produced during the use of the antioxidant oil pollutes the tin bath and produces smoke that must be dissipated by a ventilation device. Further, the produced oil sludge is easy to mix with the dross, which adversely affecting the recycling of the dross.

Therefore, it is imperative to provide a simple method to facilitate the dross separation and reduces the loss of tin so as to reduce tin consumption in the soldering process.

SUMMARY OF THE INVENTION

In order to achieve the above and other objectives, the present invention provides a dross separation method applicable to a soldering process for a printed circuit board using a tin bath containing liquid tin, which comprises the steps of: collecting dross produced during the soldering process; squeezing the dross in the tin bath to form tin ash such that a portion of tin contained in the tin ash is melted again to join the liquid tin; and scooping up and recycling the tin ash. By squeezing the dross to form tin ash such that the portion of the tin contained in the tin ash can be melted again to join the liquid tin and the tin ash not melted in the liquid tin are scooped up and recycled, the present invention easily separates the dross and meanwhile reduces the loss of tin, thereby saving tin consumption in the soldering process and leading to a reduced manufacturing cost.

DETAILED DESCRIPTION OF PREFERRED EMBODIMENTS

The following illustrative embodiments are provided to illustrate the disclosure of the present invention, these and other advantages and effects can be apparent to those in the art after reading this specification.

Figure 1:
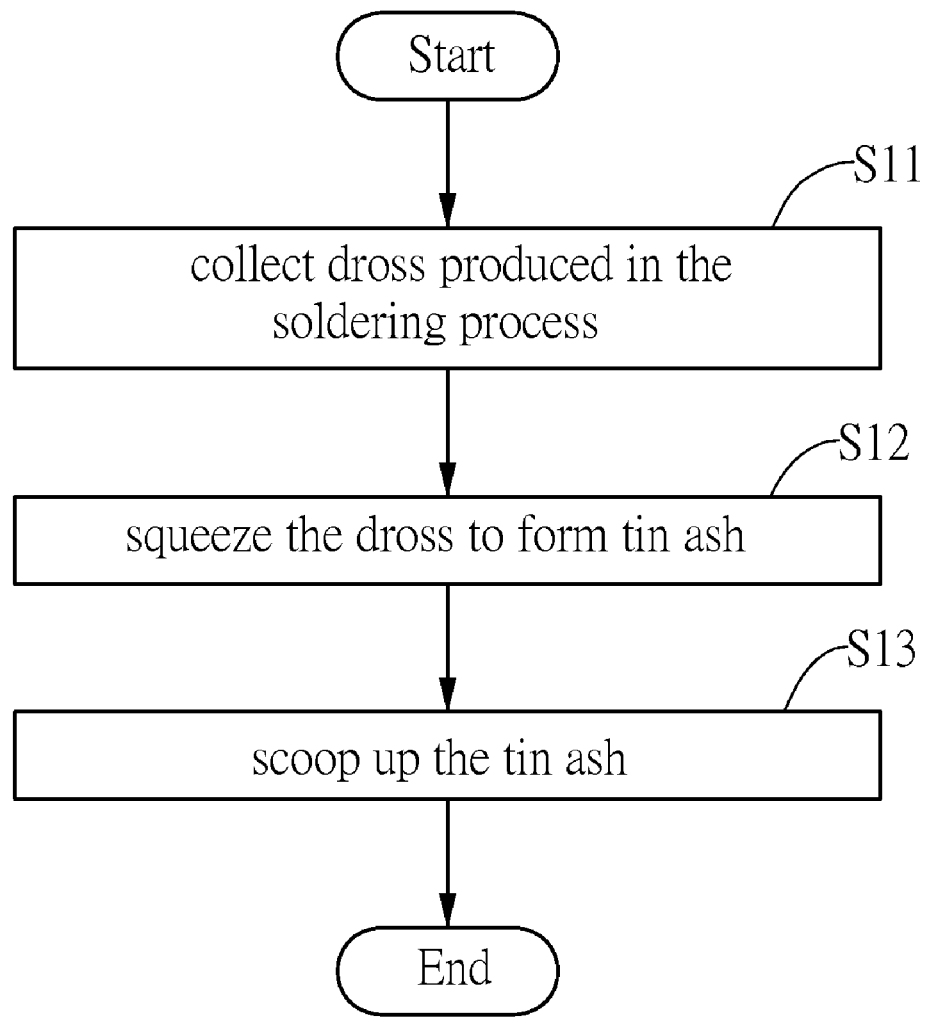
FIG. 1 is a flow diagram of a dross separation method according to a first embodiment of the present invention.

Referring to FIG. 1, there is shown a flow diagram of a dross separation method applied in a soldering process for a printed circuit board according to a first embodiment of the present invention. Therein, the printed circuit board is disposed in a tin bath which contains liquid tin, and an automatic wave soldering furnace is used to perform the soldering process on the printed circuit board. In an embodiment, the automatic wave soldering furnace comprises a heating device and a tin bath. The heating device is used to melt tin solder material into liquid tin, and then the liquid tin is received in the tin bath. The liquid tin spray upwards to form a projecting wave. When the printed circuit board comes into contact with the wave, soldering components on the printed circuit board are soldered to solder pads of the printed circuit board by the liquid tin. Then, the process of step S11 is performed.

In step S11, dross produced during the soldering process is collected and gradually accumulated. In an embodiment, a collecting tool such as a colander or a scraper is used to collect the dross from the surface of the liquid tin and bring the dross collected to one side of the inner wall of the tin bath. In practice, operators can determine the time interval for collecting the dross according to such factors as the volume of the liquid tin contained in the tin bath and the liquid tin surface oxidation rate. For example, the dross can be collected every two hours. Generally, the tin content in the dross on the surface of the liquid tin is between 60% and 80% by weight. If the dross is directly scooped up from the tin bath, a considerable amount of usable tin is also scooped up, thereby reducing the amount of tin in the tin bath. Accordingly, tin solder material needs to be added to the tin bath to replenish the tin bath. As a result, tin consumption of the soldering process is increased and the product yield is adversely affected. Therefore, step S12 is performed after step S11.

In step S12, when the dross accumulates to a certain amount, it is squeezed through a grinding process to form tin ash at the inner side of the furnace wall below the surface of the liquid tin such that a portion of tin contained in the tin ash is melted again to join the liquid tin. In an embodiment, a grinding plate with a handle can be used for squeezing and grinding the dross, wherein the grinding plate has a plurality of openings through which the portion of tin contained in the tin ash is squeezed out to melt and join the liquid tin, thereby facilitating the grinding of the dross. Non-oxidized tin contained in the dross is enveloped by oxidized tin contained in the dross. After the dross is ground into the tin ash, the non-oxidized tin contained in the dross are melted again to join the liquid tin, thereby reducing the tin content of the tin ash. Then, the process goes to step S13.

In step S13, the tin ash is scooped up, using a colander. In an embodiment, the tin content of the tin ash scooped is less than 30% by weight. Therefore, compared with the prior art, the method of the present invention advantageously features great reduction in tin loss arising from the scooping operation.

Figure 2:
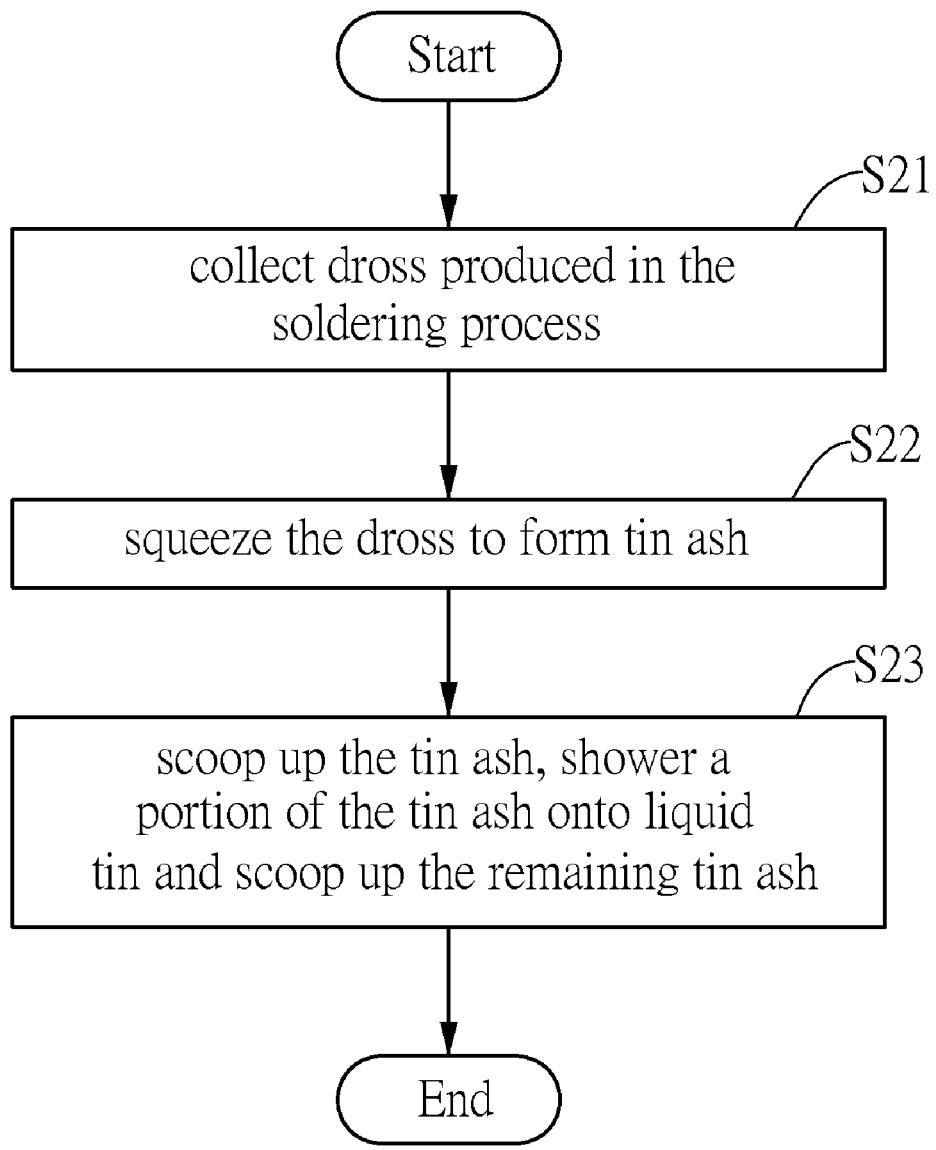
FIG. 2 is a flow diagram of a dross separation method according to a second embodiment of the present invention.

Referring to FIG. 2, there is shown a flow diagram of a dross separation method according to a second embodiment of the present invention. In an embodiment, a printed circuit board is disposed in a tin bath containing liquid tin for a soldering process. First, in step S21, during the soldering process, the dross on the surface of the liquid tin is collected and brought to one side of the inner wall of the tin bath, using a colander. Then, in step S22, when the dross accumulates to a certain amount, it is squeezed and ground by using a grinding plate with a handle so as to form tin ash at the inner side of the furnace wall below the surface of the liquid tin. Non-oxidized tin contained in the dross is enveloped by oxidized tin contained in the dross. After the dross is ground into the tin ash, non-oxidized tin are melted again to join the liquid tin, thereby reducing the tin content of the tin ash. Finally, in step S23, the tin ash is collected, using a colander, wherein a portion of the tin ash is showed onto the liquid tin to prevent generation of new dross, and the remaining portion of the tin ash is scooped up by the colander and recycled.

The above step of scooping up the tin ash may further comprise recycling the scooped tin ash by using a recovery machine. The tin ash thus formed by squeezing and grinding is directly disposed in the recovery machine for recovering pure tin therefrom without going through a grinding-powdering process.

According to the present invention, since a portion of tin contained in the tin ash is melted again to join the liquid tin, the amount of the tin ash finally scooped up and recycled is much less than the amount of the dross in a conventional soldering process. On the other hand, the tin content of the tin ash is only about 30% by weight, which is far less than the tin content of the dross (generally between 60% and 80% by weight). Therefore, the present invention reduces the required amount of dross to be scooped up and recycled and saves tin consumption in the soldering process. On the other hand, since the number of times for scooping up the dross is reduced, the burden on operators is alleviated. The present invention overcomes the conventional drawback of wastefulness of tin resources and reduces the manufacturing cost, thereby achieving a high industrial application value.

The above-described descriptions of the detailed embodiments are illustrated to disclose the preferred implementation according to the present invention, and it is not to limit the scope of the present invention, Accordingly, all modifications and variations completed by those with ordinary skill in the art should fall within the scope of present invention defined by the appended claims.

What is claimed is:

1. A dross separation method applicable to a soldering process for a printed circuit board using a tin bath containing liquid tin, comprising the steps of:
   collecting dross produced during the soldering process;
   squeezing the dross collected in the tin bath to form tin ash such that a portion of tin contained in the tin ash is melted again to join the liquid tin; and
   scooping up and recycling the tin ash.

2. The method of claim 1, wherein the dross is collected and brought to a side of the inner wall of the tin bath by using a collecting tool.

3. The method of claim 2, wherein the collecting tool is one of a colander and a scraper.

4. The method of claim 2, wherein the step of squeezing the dross further comprises a grinding process.

5. The method of claim 4, wherein the dross is squeezed and ground by using a grinding plate.

6. The method of claim 5, wherein the grinding plate has a plurality of openings through which the portion of the tin contained in the tin ash is squeezed out to melt and join the liquid tin.

7. The method of claim 1, further comprising showering a portion of the scooped and recycled tin ash onto the liquid tin.

8. The method of claim 1, wherein a tin content of the dross is between 60% and 80% by weight.

9. The method of claim 1, wherein a tin content of the tin ash is less than 30% by weight.

* * * * *